Patented Jan. 9, 1951

2,537,630

UNITED STATES PATENT OFFICE 2,537,630

PHOTOCHLORINATION OF POLYBUTADIENE

Robert J. Reid, Canal Fulton, Ohio, assignor to The Firestone Tire & Rubber Company, Akron, Ohio, a corporation of Ohio No Drawing. Application May 5, 1948,
Serial No. 25,299

3 Claims. (Cl. 204—163)

This invention relates to a process for manufacturing chlorinated synthetic elastomers, and more particularly to a process for making chlorinated polymers of butadiene.

With the advent of synthetic polymers prepared from dienes such as butadiene, isoprene, chloroprene and the like, it became desirable to prepare chlorinated products, similar to chlorinated natural rubber, from such synthetic polymers. However this has not proven feasible due, inter alia, to the behavior of the synthetic polymers during the initial stages of chlorination when carbon tetrachloride (the only economic solvent for this purpose) is employed as the chlorination medium. When natural rubber is chlorinated in carbon tetrachloride solution, there is formed, shortly after the beginning of the chlorination, a gel-like precipitate which redissolves upon further chlorination. When synthetic polymers of butadiene and the like are subjected to chlorination in carbon tetrachloride, a similar phenomenon is observed; however upon further chlorination the precipitate does not redissolve, see the German patent to Blomer 728,640, page 1, lines 17–21. When isolated from the reaction mass, this precipitated material is found to be completely insoluble in any known solvents and to be of no economic value.

It will be understood that this formation of a refractory precipitate in the chlorination of synthetic butadiene polymers may be obviated by the use of certain solvents other than carbon tetrachloride, for instance ethylene dichloride. However these solvents have the disadvantage of high cost and are, moreover, subject to chlorination during the reaction to produce compounds which are not suitable solvents for chlorination of synthetic polymers.

Accordingly it is an object of this invention to provide a novel and economical method for the chlorination of synthetic butadiene polymers.

Another object is to provide such a process which makes use of carbon tetrachloride as the chlorination solvent.

A further object is to provide such a process in which the intermediate chlorinated product, precipitated during the initial stages of the chlorination process, is capable of redissolving upon the continuation of the chlorination.

A still further object is to provide such a process in which the final chlorinated synthetic product has reduced solution viscosity fitting it for the conventional uses of chlorinated rubber.

SYNOPSIS OF THE INVENTION

The above and other objects are secured in accordance with this invention in a process which comprises (1) preparing a special sodium-catalyzed vapor-phase polymer of butadiene having a viscosity, in 2.5% solution in ethylene dichloride at 25° C., less than 100 centipoises (2) dissolving the butadiene polymer in carbon tetrachloride (3) subjecting the solution to a restrained chlorination process in which the access of the chlorine to the solution is impeded, for instance by dilution with inert gases, until the polymer is thrown out of solution as a slurry of discrete non-cohesive particles (4) continuing the chlorination under any suitable conditions until the acceptance of chlorine into the precipitated product ceases and (5) finally chlorinating the precipitated material with exposure to ultra-violet light. The foregoing process is distinguished from previous processes in which synthetic butadiene polymers have been chlorinated in carbon tetrachloride, in that the precipitated material formed as a result of the process step (3) above redissolves during the final chlorination step (5); in prior art processes such re-solution does not occur and the precipitated material is of no economic worth. The products of this invention are readily soluble in the usual solvents employed for chlorinated natural rubber, and are suitable for all the purposes for which chlorinated natural rubber has heretofore been used.

THE SPECIAL SODIUM-CATALYZED VAPOR-PHASE BUTADIENE POLYMER

There may be employed, as the starting material for the process of this invention, any sodium-catalyzed vapor-phase polymer of butadiene having a viscosity, in 2.5% ethylene dichloride solution at 25° C., in the range of 5 to 100 centipoises. Such polymers may be prepared in various ways. For instance, a conventional type of process involves the admission of butadiene vapors into a vessel having a sodium mirror coating on the interior walls thereof. In such conventional processes, in order to secure the special polymers of low viscosity for use in the practice of this invention, there must be present in the polymerization reaction a certain proportion of a modifying ingredient such as acetone, dimethyl amine, acetaldehyde, ethyl ether and ethyl chloride.

In a preferred embodiment of this invention, however, the polybutadiene is prepared by means of a special unconventional process in which a suspension of sodium sand in a solvent cement of a previously prepared polybutadiene is coated and dried upon surfaces (e. g. flat plates, walls, etc.) in a polymerization vessel and butadiene vapors are introduced into the vessel. The butadiene polymerizes upon the coated surfaces and, when a sufficient depth of polymer has been built up, the supply of butadiene is discontinued, the vessel is opened and the polymer stripped from the surfaces upon which it has formed. This polymer will inherently have the necessary viscosity properties and chemical reactivity fitting it for use in this invention, without the use of a modifier during the polymerization. This method of polymerization is the invention of another party, see the patent to Rowland 2,495,137 assigned to the assignee of the present application. The present invention is directed to a method of chlorination applicable, inter alia, to the polymers obtainable in accordance with said Rowland Patent 2,495,137.

The polybutadiene cement vehicle employed for laying down the foundation layer may be a solvent solution of any polybutadiene, preferably one prepared in a previous polymerization run of the same character. The solvent may be any suitable volatile solvent for the polybutadiene which is not reactive with the sodium, such as solvents on the order of petroleum ether, benzene, or toluene, etc., the nature of the solvents being immaterial since they are removed by evaporation from the foundation layer before the polymerization reaction. The concentration of polybutadiene in the solvent is a mere matter of convenience in coating manipulation; in general, it will be desired to lay down a coating from .001" to .01" thick upon the polymerizing surfaces in one or more coats. For this purpose, cements containing from 2% to 10% of polybutadiene, based on the weight of cement, will be found suitable. The size of the sodium particles in the cement employed as the foundation coating in the polymerization apparatus may be varied considerably; in general the particle size may vary from about 20 mesh to about 100 mesh. ("Mesh" refers to the number of openings per linear inch in a screen which will just pass the particle size in question.) The amount of sodium sand introduced into the reaction along with the cement has a distinct effect upon the solution viscosity of the product, lesser percentages of catalysts in general resulting in higher solution viscosities. In general, from about 0.5% to about 10%, based on the weight of polybutadiene ultimately produced, should be employed. An interesting feature of the polymerization process is the fact that the sodium sand particles appear to migrate with the growing mass of polymerizing butadiene, so that in the final polymerized product the sodium will be found to be uniformly dispersed throughout the polymerized mass rather than confined to the original foundation layer. The polymerization may be carried out over a wide range of temperatures and pressures: for instance the temperature of the polymerizing surfaces may be maintained over the range from 10° C. to 70° C. The partial pressure of butadiene in the reaction vessel may likewise be varied over a wide range, for instance from as low as 100 mm. of mercury up to the pressure at which the butadiene would condense to a liquid at the temperature reigning within the reaction vessel. The presence of oxygen in the reaction vessel is to be avoided; however the presence of non-reactive gases such as nitrogen or the like have no special effect beyond decreasing the effective concentration of the butadiene.

The surfaces upon which the foundation coating is applied may be of any suitable material, mechanical considerations being the principal ones. Thus surfaces of steel, aluminum, nickel, enamelled steel, and the like may be employed.

THE INITIAL CHLORINATION

Preparatory to chlorination, the butadiene polymer prepared as above described is dissolved in carbon tetrachloride to a concentration of from 1% to 5%. The higher concentrations lead to agitation difficulties during the process, so that it will be preferred to operate at concentrations less than 3%.

This solution (with vigorous agitation throughout this "Initial chlorination" and also throughout the "Final chlorination with ultra-violet light" detailed below) is next subjected to chlorination under conditions such that the access of the chlorine to the solution is restrained, i. e. so that excessively rapid chlorination is avoided and no portions of the reaction mass become substantially more highly chlorinated than any other portions. In any case this will require thorough and vigorous agitation of the reaction mass and uniform dispersion of the introduced chlorine throughout the entire reaction mass. In order to restrain the action of the chlorine, several techniques may be employed; for instance, the chlorine may be introduced as a relatively dilute solution in additional quantities of carbon tetrachloride. However the preferred and most practical technique to this end involves diluting the introduced chlorine with an inert gas on the order of nitrogen, carbon dioxide, or mixtures of these two gases such as prepared by an inert-gas-generating internal combustion engine system. In general from 1 to 8 volumes of inert gas should be employed for each volume of chlorine introduced into the reaction mixture, which gases it should be understood will be thoroughly premixed with the chlorine before such introduction. This initial chlorination may be carried out at temperatures ranging from 10° C. to 40° C. This restrained chlorination shortly causes the precipitation of the polybutadiene as a partially chlorinated intermediate product slurry.

This intermediate product slurry, thrown out as just described, is sharply distinguished both physically and chemically from materials similarly precipitated during carbon tetrachloride solution chlorinations of synthetic elastomers as conducted heretofore. The precipitate obtained in accordance with the process of this invention is mechanically dispersible and forms a mobile and workable slurry with the solvent; precipitates obtained in other processes are tough, gummy and mechanically and chemically intractable. Chemically the partially chlorinated polybutadiene precipitates obtained in this invention are capable initially of spontaneously taking up further small quantities of chlorine (up to a chlorine content of about 58%) and of taking up still further quantities of chlorine (up to a maximum of about 66% corresponding to fully chlorinated natural rubber) upon application of more energetic conditions as detailed hereinbelow. The products containing about 66% chlorine are products equivalent to chlorinated natural rubber. By way of contrast, even aside from any questions of mechanically handling the precipitated masses obtained in prior art chlorination of polybutadienes in carbon tetrachloride, such precipitated masses have been found chemically incapable of taking up further quantities of chlorine to yield marketable products.

THE FINAL CHLORINATION WITH ULTRA-VIOLET LIGHT

After the partially chlorinated polybutadiene has precipitated from the solution and after the precipitate has taken up further small quantities of chlorine (this will ordinarily result in a total chlorine content of about 58%) the precipitate ceases to absorb any further quantities of chlorine under ordinary chlorination conditions. At this point, in accordance with this invention, chlorination is continued while exposing the mass to the influence of ultra-violet light. The intensity of the illumination with the ultra-violet light may be varied over a wide range, and affects only the net rate of the output of the reaction rather than the operativeness thereof; under even the feeblest illumination the reaction will proceed at a measurable rate. However, for an economic rate of reaction, the illumination should be at least that equivalent to the output of a mercury vapor lamp or lamps operated at the rate of 2 watts (total input to all lamps) per gram of polybutadiene being processed. In general any ultra-violet radiation of equal energy to the cited mercury vapor lamp radiation obtained with the specified input, and lying in the range of 1500 to 4500 angstroms, will effect the objects of this invention. Introduction of chlorine is continued with illumination as specified and the precipitate takes up additional quantities of chlorine and redissolves in the carbon tetrachloride, eventually yielding a carbon tetrachloride solution of a chlorinated polybutadiene polymer containing in the neighborhood of from 65% to 68% chlorine. The product may be isolated from the carbon tetrachloride by suitable means, for instance the precipitation by admixture with alcohol; by injection into hot water baths ("water precipitation") whereby the solvent is flashed off leaving the chlorinated product as a spongy mass; or by spray drying.

THE FINAL PRODUCT

The final chlorinated polybutadiene products obtained in accordance with this invention are similar in properties and uses to conventional chlorinated natural rubber. They are also similar to products heretofore obtained by the chlorination of synthetic butadiene, isoprene and like polymers in solvents other than carbon tetrachloride, with the exception that the products of this invention already, and without further processing, have their viscosities reduced to values required for technical coating etc. formulation and use. Chlorinated synthetic materials prepared in accordance with conventional processes heretofore proposed have excessively high viscosities and must be subjected to a degrading process at some stage in order to yield workable products. In the case of polybutadienes this degradation is extremely difficult (if not impossible) by the conventional methods. The products of this invention, similarly to chlorinated natural rubber, have their viscosities already reduced at the end of the manufacturing process and require no artificial degradation to render them suitable for technical utilization. They are soluble in all of the solvents in which chlorinated natural rubber is soluble e. g. toluene, carbon tetrachloride, methyl ethyl ketone, etc. and compatible with all of the resins, plasticizing agents, stabilizers, compounding agents, etc. with which chlorinated natural rubber is compatible. They are accordingly suitable for all of the purposes for which chlorinated natural rubber has heretofore been used, viz. as a base resin for highly corrosion-resistant industrial paints; as coatings for use on alkaline surfaces such as concrete; as hardening agents in alkyd and other industrial lacquers, paints and finishes; as constituents in packaging and like films, particularly when blended with Buna N type rubbers which impart a considerable degree of plasticity to these materials without the addition of liquid plasticizers; as coatings on textile fabrics, paper and other web materials; as constituents of printing inks; and as a basis for molded plastic products.

CAUTIONARY NOTE

Sodium in contact with carbon tetrachloride may be explosively detonated, and some hazard might be anticipated from the introduction of sodium rubber into the carbon tetrachloride. This phenomenon has not been observed in the practice of the present invention. However, if it is desired to preclude all risk, the polymers may be worked on the wash mill to destroy the sodium.

With the foregoing general discussion in mind, there are given herewith detailed specific examples of the practice of this invention. All parts given are by weight.

EXAMPLE

A. *Preparation of special polybutadiene*

CATALYST CEMENT

| | |
|---|---|
| Benzene | 1200 parts |
| Polybutadiene (usually from previous similar runs) | 100 parts |
| Sodium sand | 1–7.5% (per Table I) (on the basis of the final polymer) |

The sodium sand was prepared by agitating melted metallic sodium with xylene. When the mixture became light tan, the agitation was discontinued and the mixture allowed to cool. The resultant sodium sand varies in size from 20 to 80 mesh, averaging 60 mesh. The sodium sand was washed by repeated decantation with dry benzene. For special runs to determine the effect of different sizes of particles, the sand was classified by screening.

A series of polymers was prepared, using various proportions of sodium sand, and operating at various temperatures, as set forth in Table I. In each run, a cement was made up from ingredients set forth in the above schedule with the selected amount of sodium sand and was coated and dried upon a series of steel plates about one foot square which were hung parallel and 1½″ apart in an autoclave. The autoclave was flushed with nitrogen and then evacuated. The temperature was adjusted to the value selected for the run and maintained at this value throughout the reaction to follow. Butadiene was then admitted to the autoclave and permitted to build up to a pressure of 30 pounds per square inch gauge which was gradually decreased to substantially zero gauge pressure over a period of 48 hours, at the end of which time the unpolymerized butadiene was vented, the autoclave purged with inert gas and opened up. The polymerization plates had a layer of polybutadiene about ½″ thick thereon, which layer was stripped off and employed in the chlorination step detailed hereinafter.

RESTRAINED CHLORINATION STEP

Carbon tetrachloride _____ 100 parts
Polybutadiene (prepared as described above, per Table I) _____ 1, 2 or 3 parts (per Table I)
Mixed:
   Chlorine _____ 1 volume
   Nitrogen _____ 1, 2, 5 or 8 volumes (per Table I)

A series of chlorination runs were made, using as starting materials various polybutadienes prepared as above described. In each case a cement was made from the selected polybutadiene and carbon tetrachloride and introduced into a closed reaction vessel provided with an anchor stirrer, a gas diffuser at the bottom and a reflux condenser venting to a waste gas stack at the top.

The reaction vessel was also provided with a mercury vapor lamp arranged to illuminate the contents of the vessel. This lamp was not energized during the early stages of the reaction. The chlorine and nitrogen mixture was introduced into the cement through the diffuser and almost immediately a gel phase appeared in the reaction mass. This precipitated gel, although fairly thick, was not coherent and remained tractable and workable. As soon as no further amounts of gel appeared to be formed, pure chlorine was introduced through the diffuser and introduction continued until the reaction mass refused to take up further quantities of chlorine spontaneously.

ULTRA-VIOLET CHLORINATION

At this point the mercury vapor ultra-violet light was turned on (the lamp is regulated to draw 20 watts per gram of polybutadiene in the vessel) and introduction of chlorine and agitation continued for a further 7 hours. During this time the gel underwent further chlorination and redissolved slowly in the carbon tetrachloride, ultimately yielding an entirely homogeneous solution. This solution was then injected into a boiling water bath which flashed off the carbon tetrachloride, leaving the chlorinated product in spongy precipitated form. This product contained approximately 66% chlorine, indicating substantially complete chlorination and was substantially identical in properties to chlorinated natural rubber. Particulars of the several chlorination runs and of the antecedent preparation of the polybutadienes employed therein are set forth herewith in Table I.

TABLE I

| Polymerization of Butadiene | | | | Chlorination of Polybutadiene | | | | |
|---|---|---|---|---|---|---|---|---|
| Na Catalyst | | | | Initial Chlorination | | Chlorinated Product | | |
| Size (mesh No.) | Amount (per cent, basis of weight of polybutadiene produced) | Temp., °C. | Viscosity[1] of Polybutadiene, cps. | Conc. of Polybutadiene (per cent of solution) | Vol. $N_2$ per Vol. $Cl_2$ | Viscosity,[1] cps. | Chlorine Content, per cent | Run No. |
| 20 | 3.9 | 25 | 18.2 | 2 | 5 | 70 | 66.0 | 1 |
| 40 | 3.7 | 25 | 12.3 | 2 | 5 | 68 | 66.3 | 2 |
| 60 | 1.1 | 25 | 28.0 | 2 | 5 | 110 | 66.8 | 3 |
| | 1.9 | 25 | 20.0 | 2 | 5 | 93 | 66.3 | 4 |
| | 2.8 | 25 | 14.0 | 2 | 5 | 65 | 65.5 | 5 |
| | 3.7 | 25 | 10.1 | 2 | 5 | 34 | 66.0 | 6 |
| | 5.2 | 25 | 9.0 | 2 | 5 | 20 | 67.0 | 7 |
| | 8.5 | 25 | 7.0 | 2 | 5 | 17 | 66.8 | 8 |
| 80 | 3.7 | 25 | 7.2 | 2 | 5 | 18 | 67.5 | 9 |
| mixed[2] | 4.5 | 10 | 40.0 | 2 | 5 | 376 | 65.3 | 10 |
| | 5.0 | 25 | 16.0 | 1 | 4 | 80 | 65.2 | 11 |
| | | | | 2 | 4 | 58 | 67.6 | 12 |
| | | | | | 0 | insoluble gel | | 13 |
| | | | | | 2 | 30 | 65.0 | 14 |
| | | | | 3 | 4 | 24 | 67.0 | 15 |
| | | | | | 8 | 18 | 67.5 | 16 |
| | 4.8 | 50 | 8.5 | 3 | 5 | 25 | 66.3 | 17 |

[1] Viscosity, in centipoises, of a 2.5% solution, in ethylene dichloride, at 25° C.
[2] Mixed sizes of Na particles, ranging from 20 to 80 mesh, taken without selection or screening from the original suspension in benzene.

From the foregoing general discussion and detailed specific examples it will be evident that this invention provides a process for the production of chlorinated polymers of butadiene which makes use of carbon tetrachloride as the chlorination medium. This solvent is low in original cost, and is not subject to destruction by further chlorination. The products have all the desirable properties of chlorinated natural rubber and may be used for the same applications as that material. As distinguished from the other chlorinated polymers of butadiene heretofore prepared by means of solvents other than carbon tetrachloride, the products of this invention have at no point been subjected to artificial degradation in order to provide viscosity characteristics required in specific applications; instead the adjustment of this property is effected by variations in the preparation of the original polybutadiene. The process may be carried out expeditiously, with the aid of relatively unskilled attendants, in readily and cheaply procurable equipment.

What is claimed is:

1. Process which comprises (1) preparing a vapor-phase sodium-catalyzed butadiene polymer having a viscosity, in 2.5% ethylene dichloride solution, of from 5 to 100 centipoises (2) dissolving the butadiene polymer in carbon tetrachloride to form a solution containing from 1% to 5% by weight of the butadiene polymer (3) introducing into the resulting solution at from 10° C. to 40° C. a mixture of chlorine with from 1 to 8 volumes of an inert gas per volume of chlorine until the formation of a precipitate takes place and is completed (4) introducing chlorine until spontaneous uptake of chlorine by the precipitate ceases and (5) continuing the introduction of chlorine while subjecting the reaction mass to irradiation with ultra-violet light until the precipitate redissolves.

2. Process which comprises (1) preparing a polymer of butadiene having a viscosity, in 2.5% ethylene dichloride solution, of from 5 to 100 centipoises by contacting gaseous monomeric butadiene with a surface coated with polybutadiene having dispersed therein finely comminuted sodium (2) dissolving the resultant polybutadiene in carbon tetrachloride to form a solution containing from 1% to 5% by weight of the butadiene polymer (3) contacting the resulting solution at from 10° C. to 40° C. with a mixture of chlorine with from 1 to 8 volumes per volume of chlorine of an inert gas until separation of a precipitate has taken place and has been completed (4) introducing chlorine until spontaneous uptake of chlorine by the precipitate ceases and (5) contacting the reaction mass with chlorine while subjecting said reaction mass to irradiation with ultra-violet light until the precipitate redissolves.

3. Process which comprises (1) preparing a polymer of butadiene having a viscosity, in 2.5% ethylene dichloride solution, of from 5 to 100 centipoises by contacting gaseous monomeric butadiene with a surface coated with polybutadiene having dispersed therein from 1% to 7%, based on the weight of polybutadiene product, of a sodium sand having fineness ranging from 20 mesh to 100 mesh (2) dissolving the resultant polybutadiene in carbon tetrachloride to form a solution containing from 1% to 5% by weight of the butadiene polymer (3) contacting the resulting solution at from 10° C. to 40° C. with a mixture of chlorine with from 1 to 8 volumes per volume of chlorine of an inert gas until separation of a precipitate has taken place and has been completed (4) continuing the introduction of chlorine until spontaneous uptake of chlorine by the precipitate ceases and (5) contacting the reaction mass with chlorine while subjecting said reaction mass to irradiation with ultra-violet light until the precipitate redissolves.

ROBERT J. REID.

REFERENCES CITED

The following references are of record in the file of this patent:

UNITED STATES PATENTS

| Number | Name | Date |
| --- | --- | --- |
| 1,809,445 | Heuck et al. | June 9, 1931 |
| 2,067,172 | Carothers | Jan. 12, 1937 |
| 2,209,746 | Ebert et al. | July 30, 1940 |
| 2,291,574 | Gleason et al. | July 28, 1942 |
| 2,292,737 | Blomer et al. | Aug. 11, 1942 |
| 2,422,919 | Myles et al. | June 24, 1947 |
| 2,481,188 | Babayan | Sept. 6, 1949 |